United States Patent
Jang

(10) Patent No.: US 12,179,688 B1
(45) Date of Patent: Dec. 31, 2024

(54) KNEE AIRBAG FOR VEHICLES

(71) Applicant: HYUNDAI MOBIS CO., LTD., Seoul (KR)

(72) Inventor: Woo Hyeong Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/505,533

(22) Filed: Nov. 9, 2023

(30) Foreign Application Priority Data

Jun. 28, 2023 (KR) ........................ 10-2023-0083254

(51) Int. Cl.
| | |
|---|---|
| *B60R 21/206* | (2011.01) |
| *B60R 21/233* | (2006.01) |
| *B60R 21/2334* | (2011.01) |
| *B60R 21/237* | (2006.01) |
| *B60R 21/231* | (2011.01) |

(52) U.S. Cl.
CPC ........ *B60R 21/2334* (2013.01); *B60R 21/206* (2013.01); *B60R 21/233* (2013.01); *B60R 21/237* (2013.01); *B60R 2021/23169* (2013.01); *B60R 2021/23324* (2013.01)

(58) Field of Classification Search
CPC . B60R 21/2334; B60R 21/206; B60R 21/233; B60R 21/237; B60R 2021/23169; B60R 2021/23324
See application file for complete search history.

(56) References Cited

U.S. PATENT DOCUMENTS

| | | | | |
|---|---|---|---|---|
| 8,297,649 | B2 * | 10/2012 | Enders | B60R 21/231 |
| | | | | 280/743.2 |
| 11,926,277 | B1 * | 3/2024 | Gould | B60R 21/206 |
| 2002/0171232 | A1 * | 11/2002 | Abe | B60R 21/206 |
| | | | | 280/730.1 |
| 2011/0156378 | A1 * | 6/2011 | Matsushima | B60R 21/231 |
| | | | | 280/730.1 |
| 2011/0285114 | A1 * | 11/2011 | Ohara | B60R 21/2338 |
| | | | | 280/730.1 |
| 2012/0112441 | A1 * | 5/2012 | Ohara | B60R 21/205 |
| | | | | 280/729 |
| 2014/0291972 | A1 * | 10/2014 | Fukawatase | B60R 21/231 |
| | | | | 280/729 |
| 2016/0046253 | A1 * | 2/2016 | Jung | B60R 21/206 |
| | | | | 280/729 |
| 2018/0345899 | A1 * | 12/2018 | Munsee | B60R 21/233 |
| 2019/0061667 | A1 * | 2/2019 | Abe | B60R 21/206 |
| 2023/0234531 | A1 * | 7/2023 | Hioda | B60R 21/2338 |
| | | | | 280/732 |
| 2023/0356686 | A1 * | 11/2023 | Young | B60R 21/2338 |

FOREIGN PATENT DOCUMENTS

KR          102305957 B1 *  9/2021

* cited by examiner

*Primary Examiner* — Toan C To
(74) *Attorney, Agent, or Firm* — Novo TechIP International PLLC

(57) ABSTRACT

A knee airbag for vehicles is deployed to prevent an occupant's body from suffering additional injuries when a collision occurs. The knee airbag for vehicles includes a main panel deployed toward the occupant and a partition unit disposed inside the main panel to partition an inner space of the main panel and configured to form a bypass flow path inside the main panel so that a protection region is deployed later than a non-protection region.

7 Claims, 8 Drawing Sheets

182

⟶ : GAS FLOW DIRECTION

182

→ : GAS FLOW DIRECTION

KNEE AIRBAG FOR VEHICLES

CROSS-REFERENCE TO RELATED APPLICATIONS

This application claims priority to and the benefit of Korean Patent Application No. 10-2023-0083254, filed on 28 Jun. 2023, the disclosure of which is incorporated herein by reference in its entirety.

TECHNICAL FIELD

The present invention relates to a knee airbag for vehicles.

BACKGROUND

In general, vehicles are equipped with various types of airbag devices to protect occupants when an accident occurs. Among the airbag devices, a knee airbag is an airbag that is installed inside a cockpit module and protects lower bodies of occupants sitting in a driver's seat and a passenger seat next to the driver's seat, which may be called a first row region of a passenger compartment. More specifically, the knee airbag may be deployed toward an occupant's knees and absorb shock transmitted from the occupant's lower body, including the occupant's knees, which is moved toward the ceiling of a vehicle when a collision accident occurs.

Like airbags installed in the vehicle, the knee airbag is deployed as if all regions are deployed simultaneously by gas emitted from an inflator. However, since a knee airbag in the related art grazes the occupant's knees, there is a problem in that the occupant's lower body suffers injuries such as abrasions or lacerations due to chafing.

In addition, since the knee airbag in the related art requires separate parts, such as a tether, for guiding a deployment direction to protect the occupant's knees, there is a problem in that production costs and production times are increased and thus productivity is reduced.

SUMMARY

The present invention is directed to providing a knee airbag for vehicles improved to be deployed to prevent an occupant's body from suffering additional injuries when a collision accident occurs.

According to an aspect of the present invention, there is provided a knee airbag for vehicles disposed in a region facing an occupant's knees in a cockpit module, the knee airbag for vehicles including a main panel deployed toward the occupant and a partition unit disposed inside the main panel to partition an inner space of the main panel and configured to form a bypass flow path inside the main panel so that a protection region is deployed later than a non-protection region.

The partition unit may form a main flow path that forms a space in which gas passing through the bypass flow path deploys the protection region together with the main panel.

The main panel may include a non-contact portion disposed to face the cockpit module when the knee airbag is deployed, a contact portion disposed to face the occupant when the knee airbag is deployed, a first connection portion disposed between the non-contact portion and the contact portion and separating the non-contact portion and the contact portion, and a second connection portion connected to the contact portion, bent from the contact portion and then connected to the non-contact portion.

The partition unit may include a branch plate disposed close to the second connection portion and branching gas generated from an inflator coupled to the second connection portion and side plates disposed at both ends of the branch plate and forming the bypass flow path together with an edge region of the main panel.

The side plate may include a first end that guides the non-contact portion so that the non-contact portion of the main panel is bent when the side plate is coupled to the main panel, a second end that guides the contact portion so that the contact portion of the main panel is bent when the side plate is coupled to the main panel, and a third end that connects the first end and the second end and supports the branch plate.

The first end may include a first portion (i.e. 1-1 end) extending from the third end and a second portion (i.e., 1-2 end) extending from the first portion (1-1 end) to form an L shape so as to guide a deployment direction of the non-contact portion when the knee airbag is deployed and the second end includes a first portion (i.e., 2-1 end) extending from the third end and a second portion (i.e., 2-2 end) extending from the first portion (2-1 end) to form an L shape so as to guide a deployment direction of the contact portion when the knee airbag is deployed.

A first vertical length of the contact portion of the main panel may be equal to a sum of a second vertical length of the non-contact portion of the main panel and a third vertical length of the second connection portion.

The first vertical length of the contact portion may be longer than a sum of a first length of the 1-1 end and a second length of the 1-2 end of the side plate, and the second vertical length of the non-contact portion may be longer than a sum of a third length of the 2-1 end and a fourth length of the 2-2 end of the side plate.

The third end may be disposed to be inclined downwardly and rearwardly along a direction from the 1-1 end to the 2-1 end.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
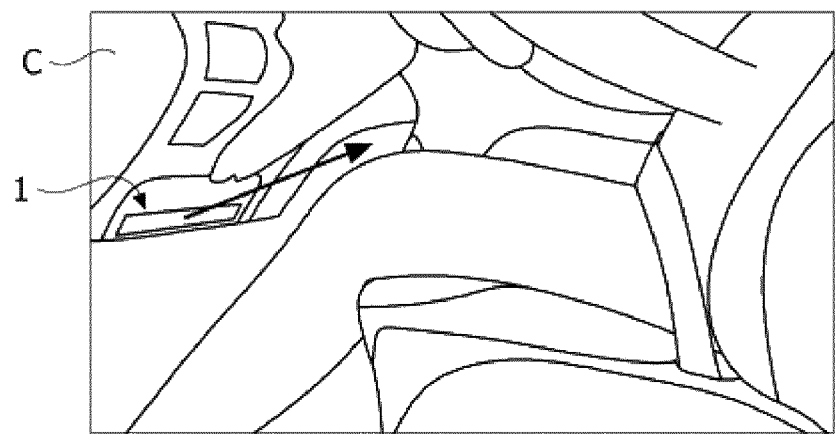
FIG. 1 a diagram illustrating a state where a knee airbag for vehicles is installed in a cockpit module according to one embodiment of the present invention.

Since the present invention may be variously modified and embodied, particular embodiments thereof will be illustrated in the drawings and described. However, this is not intended to limit the present invention to the specific embodiments, and it should be understood to include all modifications, equivalents, and substitutes included in the spirit and scope of the present invention.

Although the terms including ordinal numbers such as first, second, or the like, may be used to describe various elements, these elements are not limited by these terms. These terms are only used to distinguish one element from another element. For example, without departing from the scope of the present invention, a second element could be called a first element, and similarly, a first element could be called a second element. The term "and/or" includes a combination of a plurality of related listed items or any of a plurality of related listed items.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In the description of embodiments, when one element is described as being formed "on" or "under" another element, "on" or "under" includes both a case in which the two elements are directly in contact with each other and a case in which at least one additional element is formed to be disposed between the two elements (indirectly). Further, when expressed as "on or under", the expression may include the meaning of not only an upward direction but also a downward direction based on one element.

The terms used in the present application are merely provided to describe specific embodiments, and are not intended to limit the present invention. The singular forms are intended to include the plural forms as well, unless the context clearly indicates otherwise. In the present application, it will be further understood that the terms "includes" and/or "have", when used in this specification, specify the presence of stated features, integers, steps, operations, elements, components, and/or combinations thereof, but do not preclude the possibility of the presence or addition of one or more other features, integers, steps, operations, elements, components, or combinations thereof.

Unless otherwise defined, all terms used herein, including technical or scientific terms, have the same meaning as commonly understood by those of ordinary skill in the art to which the present invention belongs. Terms, such as those defined in commonly used dictionaries, should be interpreted as having a meaning that is consistent with their meaning in the context of the related art and will not be interpreted in an idealized or overly formal sense unless expressly so defined herein.

Hereinafter, a knee airbag for vehicles will be described in detail with reference to the accompanying drawings, but identical or corresponding components are denoted by the same reference numerals regardless of figure numbers, and redundant descriptions thereof will be omitted.

Figure 2:
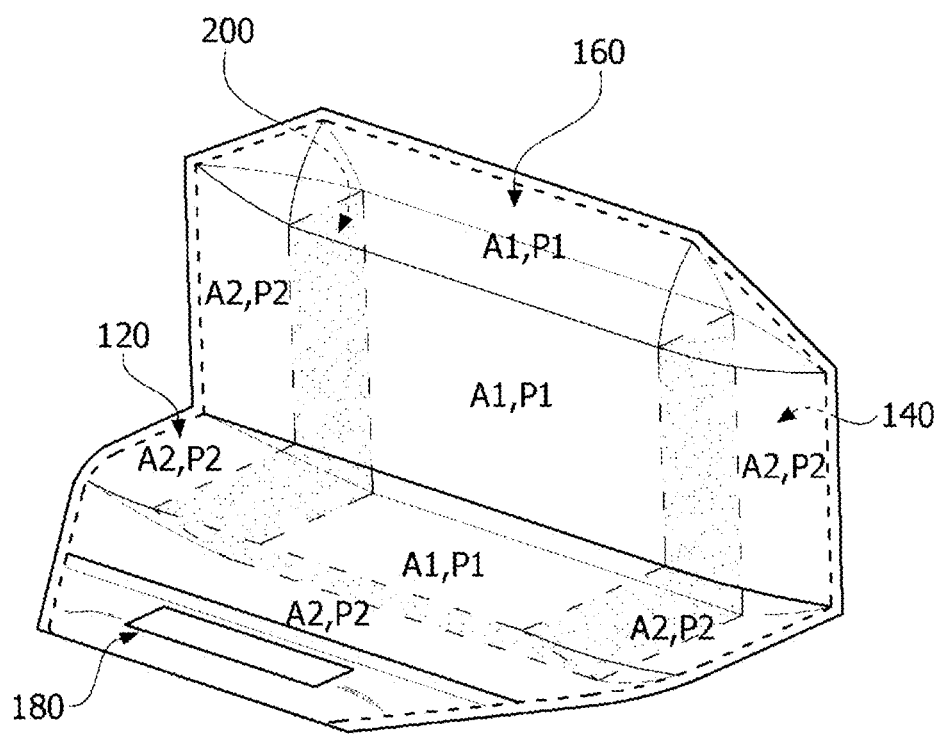
FIG. 2 is a diagram illustrating a fully opened state of the knee airbag for vehicles according to one embodiment of the present invention.
Figure 3:
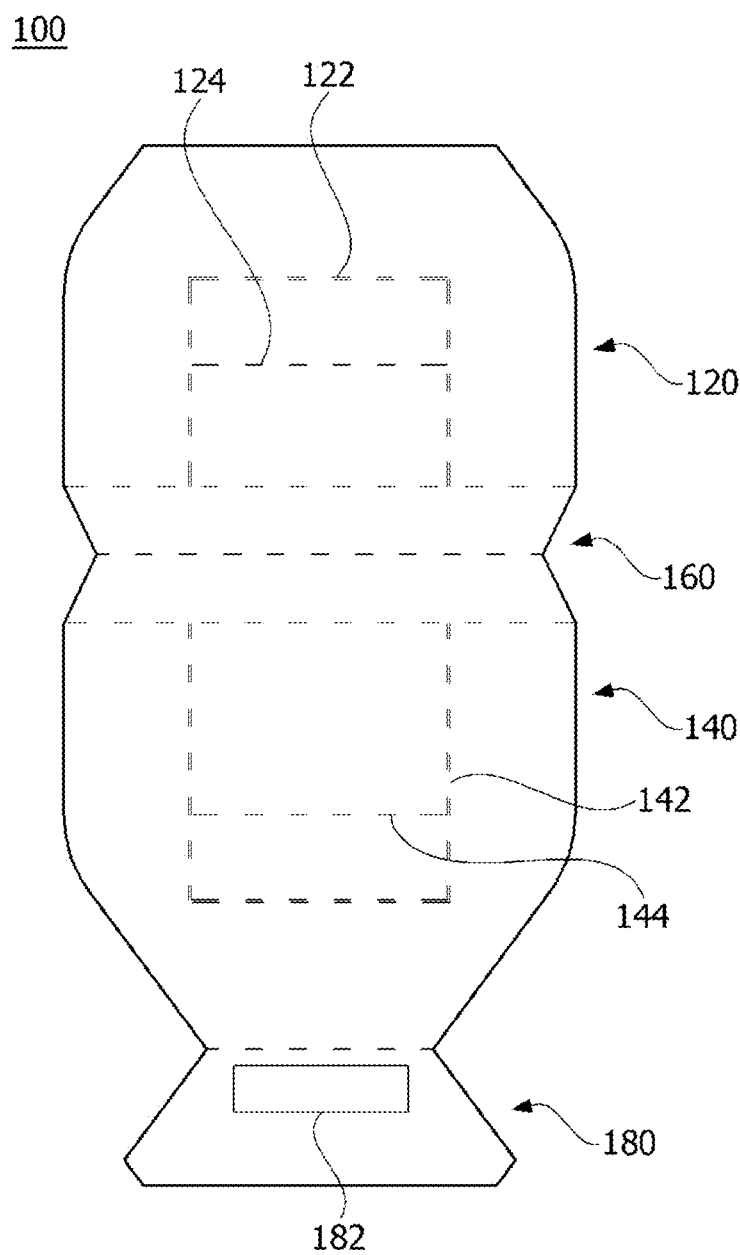
FIG. 3 is a diagram illustrating a main panel.
Figure 4:
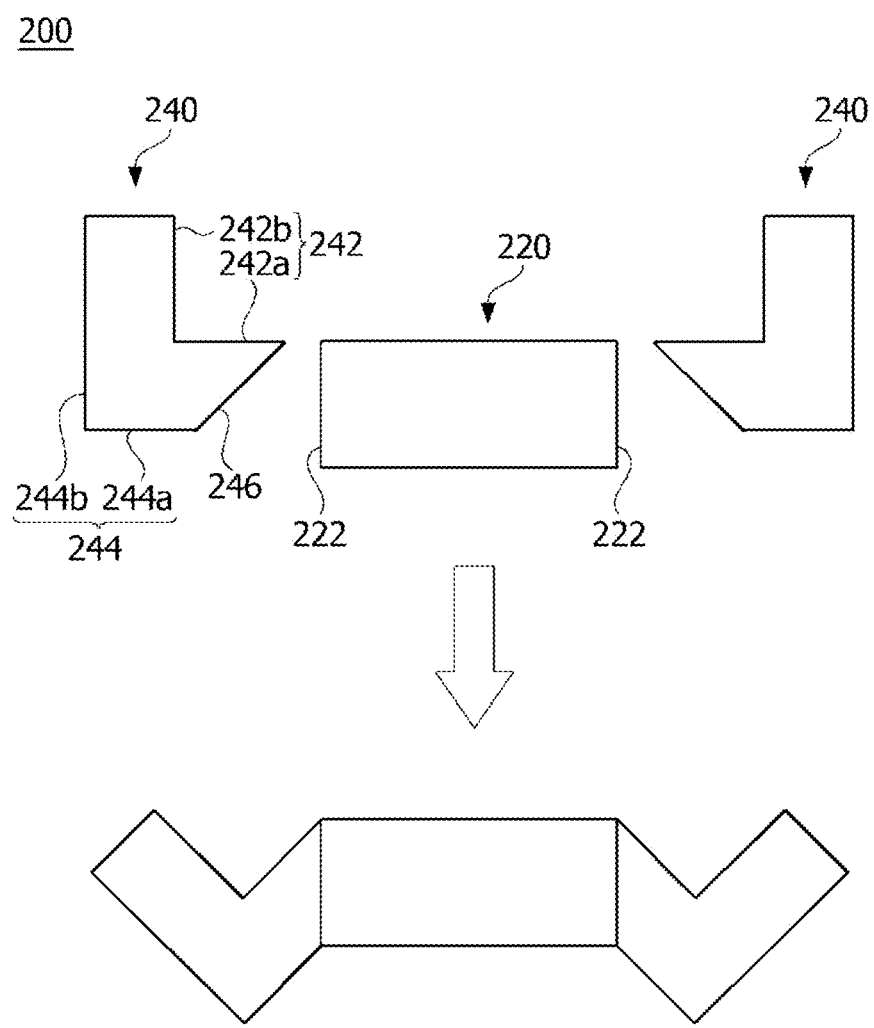
FIG. 4 is a diagram illustrating a partition unit.
Figure 5:
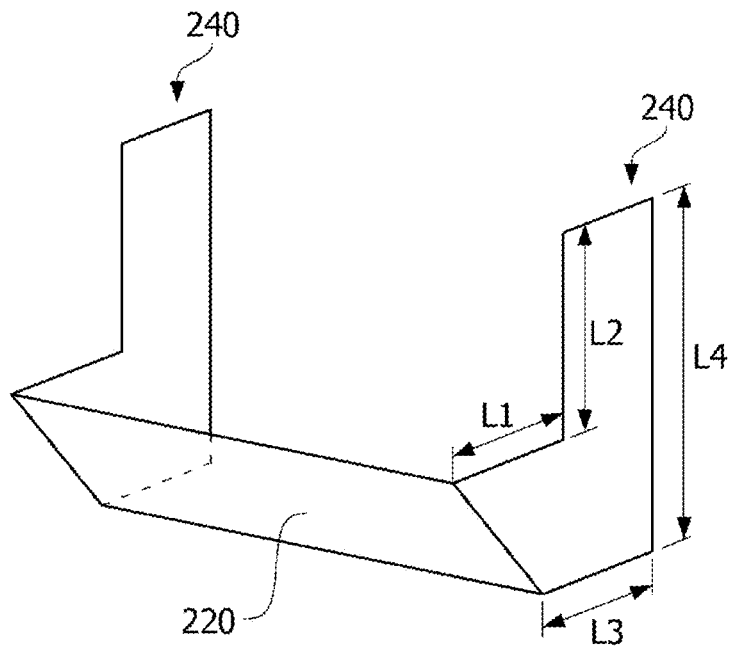
FIG. 5 is a perspective view illustrating a state where a branch plate and side plates are combined.

FIG. 1 is a diagram illustrating a state where a knee airbag for vehicles is installed in a cockpit module according to one embodiment of the present invention, FIG. 2 is a diagram illustrating a fully opened state of a knee airbag for vehicles according to one embodiment of the present invention, FIG. 3 is a diagram illustrating a main panel, FIG. 4 is a diagram illustrating a partition unit, and FIG. 5 is a perspective view illustrating a state where a branch plate and side plates are combined.

Referring to FIG. 1, a knee airbag 1 for vehicles according to one embodiment of the present invention may be disposed inside a cockpit module C installed in a passenger compartment of a vehicle. More specifically, the knee airbag 1 for vehicles may be disposed in a region of the cockpit module C facing an occupant's knees. In the present embodiment, the knee airbag 1 for vehicles is exemplified as being disposed in the region facing a driver's seat in the cockpit module C, but the knee airbag 1 for vehicles is not limited thereto and may be disposed in a region of the cockpit module C facing a passenger seat. The knee airbag 1 for vehicles may be disposed inside the cockpit module C in a folded state including rolling, and when a collision accident occurs, the knee airbag 1 for vehicles may be released from the folded state and protrude to the outside of the cockpit module C and inflate on an upper side of the occupant's lower body.

Referring to FIGS. 2 to 5, the knee airbag 1 for vehicles may include a main panel 100 and a partition unit 200.

The main panel 100 may be deployed toward an occupant. The main panel 100 may include a non-contact portion 120, a contact portion 140, a first connection portion 160, and a second connection portion 180.

The non-contact portion 120 may be disposed to face the cockpit module C when the knee airbag 1 is deployed (inflated). The non-contact portion 120 may be disposed on one side of the first connection portion 160. The non-contact portion 120 may include a first guideline 122 and a second guideline 124.

The first guideline 122 may construct a closed rectangular region through the first connection portion 160. The first guideline 122 may be disposed on an outer or inner surface of the non-contact portion 120. The first guideline 122 may serve to fix a position of the partition unit 200.

The second guideline 124 may be disposed inside the first guideline 122. The second guideline may guide a position where an end 222 of a side plate 240 of the partition unit 200, which will be described below, is disposed.

The contact portion 140 may be disposed to face the occupant when the knee airbag 1 is deployed (inflated). The contact portion 140 may be disposed on the other side of the first connection portion 160 and spaced apart from the non-contact portion 120 with the connection portion interposed therebetween. The contact portion 140 may include a third guideline 142 and a fourth guideline 144.

The third guideline 142 may construct a closed rectangular region through the first connection portion 160. The third guideline 142 may be disposed on an outer or inner surface of the contact portion 140. The third guideline 142 may serve to fix the position of the partition unit 200.

The fourth guideline 144 may be disposed inside the third guideline 142. The fourth guideline may guide a position where the end 222 of the side plate 240 of the partition unit 200, which will be described below, is disposed.

The first connection portion 160 may be disposed between the non-contact portion 120 and the contact portion 140. The first connection portion 160 may separate the non-contact portion 120 and the contact portion 140. The first connection portion 160 may have a wedge-shaped side portion that is concave inward. The first connection portion 160 may be a thickness of the knee airbag 1 for vehicles when the knee airbag 1 for vehicles is inflated.

The second connection portion 180 may be connected to the contact portion 140. The second connection portion 180 may be bent from the contact portion 140 and then connected to the non-contact portion 120. The second connection portion 180 may be connected to the non-contact portion 120 so that the main panel 100 becomes a closed circuit. The second connection portion 180 may include a fixing portion 182.

The fixing portion 182 may be disposed inside the second connection portion 180. The fixing portion 182 may fix an inflator (not illustrated). The inflator (not illustrated) fixed to the fixing portion 182 may generate gas and then discharge the gas into the inside of the knee airbag 1 for vehicles.

The partition unit 200 may be disposed inside the main panel 100. The partition unit 200 may partition an inner space of the main panel 100. The partition unit 200 may divide the protective main panel 100 into a protection region A1 and a non-protection region A2.

The partition unit 200 may form a bypass flow path P2 inside the main panel 100 so that the protection region A1 is deployed later than the non-protection region A2. Additionally, the partition unit 200 may form a main flow path P1 that forms a space in which gas passing through the bypass flow path P2 deploys the protection region A1 together with the main panel 100. That is, the partition unit 200 may form a partition wall in the main panel 100 so that the occupant is prevented from suffering injuries due to an operation such as the main panel 100 grazing the occupant's body (knees). Accordingly, the partition unit 200 may be configured to help the knee airbag 1 for vehicles establish the occupant-friendly protection region A1.

Here, the protection region A1 may be a region that covers the occupant's lower body, including the knees, when the knee airbag 1 for vehicles is inflated, and the non-protection region A2 may be a region disposed on a side of the protection region A1 and disposed outside the protection region A1.

In addition, the bypass flow path P2 is a flow path formed outside the partition unit 200 by the partition unit 200 inside the main panel 100. Accordingly, the flow path formed inside the partition unit 200 may be the main flow path P1 in which the gas that inflates the protection region A1 is accommodated. That is, the non-protection region A2 may be inflated by gas passing through the bypass flow path P2, and the protection region A1 may be inflated by gas accommodated in the main flow path P1.

The partition unit 200 may include a branch plate 220 and the side plate 240.

As illustrated in FIGS. 4 and 5, the branch plate 220 may be disposed close to the second connection portion 180 of the main panel 100. The branch plate 220 may branch gas generated from the inflator (not illustrated) coupled to the second connection portion 180. The branch plate 220 may be provided in a rectangular shape. The branch plate 220 may be disposed to be inclined with respect to the contact portion 140 of the main panel 100 by the side plate 240.

The side plate 240 may be disposed at both ends 222 of the branch plate 220. That is, a plurality of side plates 240 may be provided. The side plate 240 may form the bypass flow path P2 together with an edge region of the main panel 100. The side plate 240 may be provided in an 'L' shape. The side plate 240 may include a first end 242, a second end 244, and a third end 246.

The first end 242 may guide the non-contact portion 120 of the main panel 100 so that the non-contact portion 120 is bent when the main panel 100 and the side plate 240 are coupled. That is, the first end 242 may be coupled to the non-contact portion 120 of the main panel 100. The first end 242 may include a 1-1 end 242a and a 1-2 end 242b.

The 1-1 end 242a may be disposed to be inclined to the third end 246. The 1-2 end 242b may be disposed to be inclined from the 1-1 end 242a, and may guide a deployment direction of the non-contact portion 120 when the knee airbag 1 for vehicles is deployed. In the present embodiment, the 1-2 end 242b is disposed to form an angle at which the 1-2 end 242b perpendicularly intersects the 1-1 end 242a, but the present invention is not limited thereto.

Based on the second guideline 124 of the non-contact portion 120 of the main panel 100 illustrated in FIG. 3, the 1-1 end 242a may be disposed on a narrow length portion of the first guideline 122, and the 1-2 end 242b may be disposed on a wide length portion of the first guideline. The non-contact portion 120 of the main panel 100 that is guided and bent at the 1-2 end 242b may be deployed toward the passenger compartment.

The second end 244 may guide the contact portion 140 of the main panel 100 so that the contact portion 140 is bent when the second end 244 is coupled to the main panel 100. The second end 244 may be coupled to the contact portion 140 of the main panel 100. The second end 244 may include a 2-1 end 244a and a 2-2 end 244b.

The 2-1 end 244a may be disposed to be inclined to the third end 246. The 2-2 end 244b may be disposed to be inclined from the 2-1 end 244a, and may guide a deployment direction of the contact portion 140 when the knee airbag 1 for vehicles is deployed. In the present embodiment, the 2-2 end 244b is disposed to form an angle at which the 2-2 end 244b perpendicularly intersects the 2-1 end 244a, but the present invention is not limited thereto.

Based on the fourth guideline 144 of the contact portion 140 of the main panel 100 illustrated in FIG. 3, the 2-1 end 244a may be disposed on a narrow length portion of the third guideline 142, and the 2-2 end 244b may be disposed on a wide length portion of the third guideline. The contact portion 140 of the main panel 100 that is guided and bent at the 2-2 end 244b may be deployed toward the passenger compartment.

The third end 246 may connect the first end 242 and the second end 244. The third end 246 may support the branch plate 220.

The third end 246 may be disposed to be inclined downwardly and rearwardly along a direction from the 1-1 end 242a to the 2-1 end 244a. This may prevent the bypass flow path P2 from becoming narrow when the third end 246 is disposed to perpendicularly intersect the 1-1 end 242a and the 2-1 end 244a. Accordingly, this shape of the third end 246 may help smooth flow of gas discharged from the inflator (not illustrated).

Figure 6:
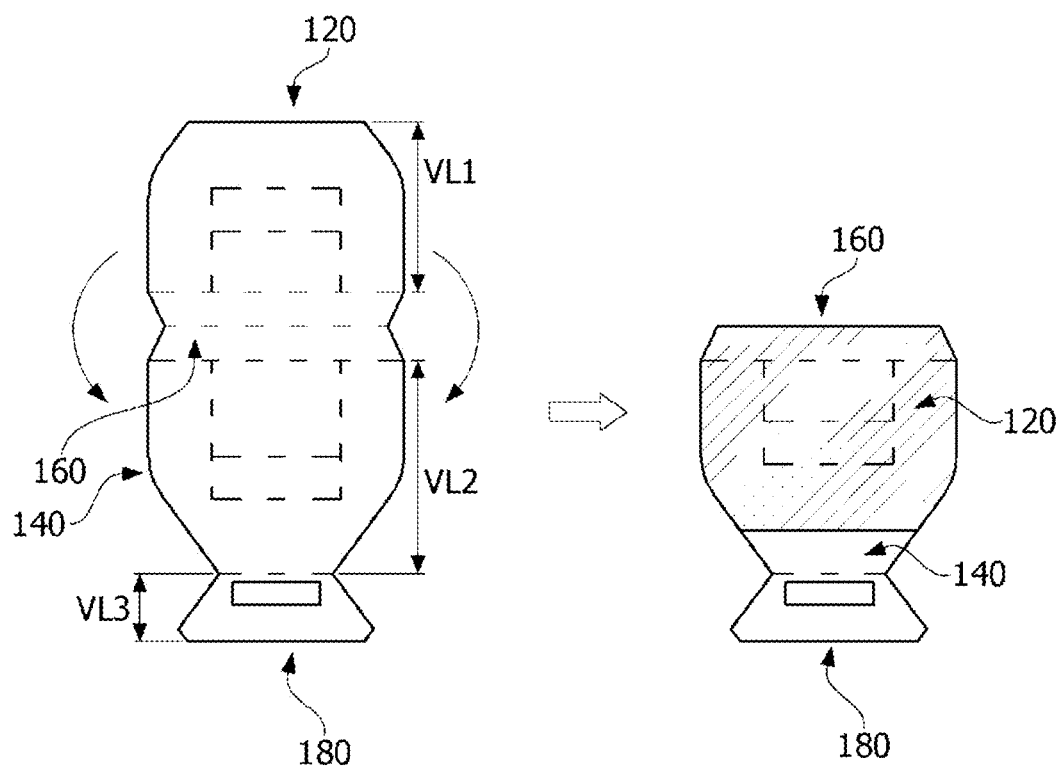
FIG. 6 is a diagram illustrating a process of folding the main panel.
Figure 7:
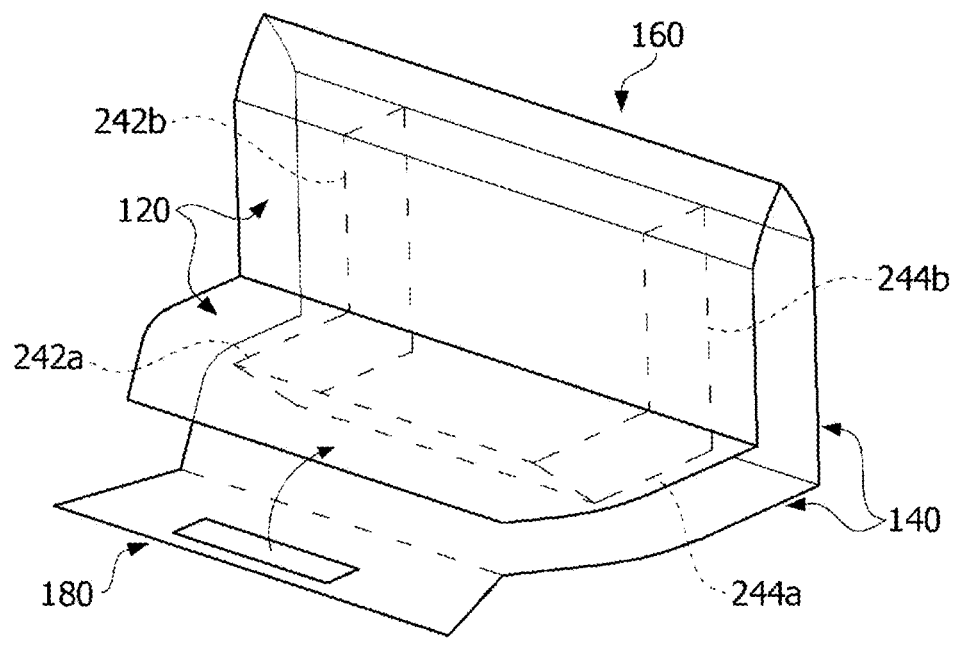
FIG. 7 is a diagram illustrating a state where a second connection portion is folded after the partition unit is disposed inside the main panel in a folded state.
Figure 7:
Figure 7:
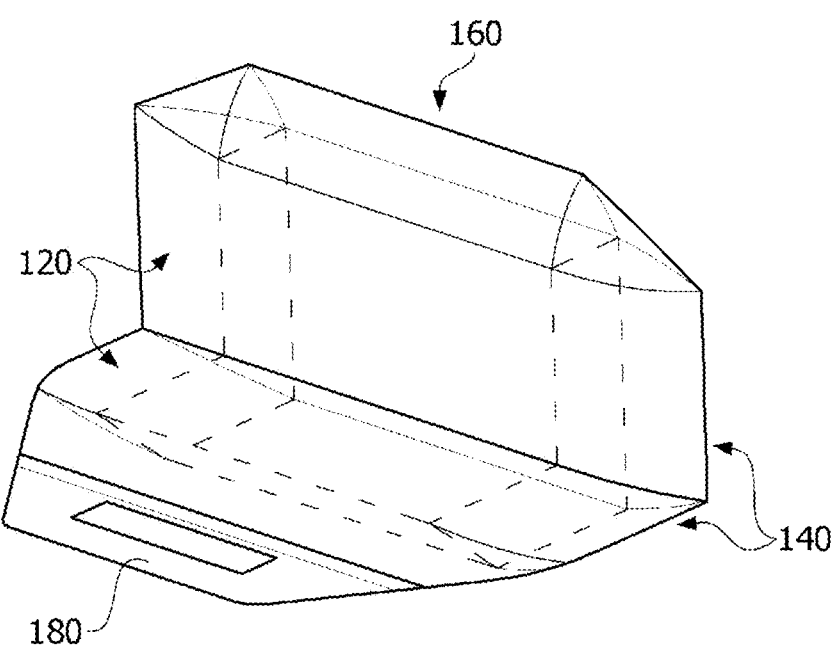

FIG. 6 is a diagram illustrating a process of folding a main panel, and FIG. 7 is a diagram illustrating a state where a second connection portion is folded after a partition unit is disposed inside the main panel in a folded state.

Referring to FIGS. 6 and 7, a first vertical length VL1 of the contact portion 140 of the main panel 100 may be equal to the sum of a second vertical length VL2 of the non-contact portion 120 of the main panel 100 and a third vertical length VL3 of the second connection portion 180. As illustrated in FIG. 6, this may mean that when the second connection portion 180 of the main panel 100 is folded in a state where the contact portion 140 is folded, an edge shape in a state where the contact portion 140 and the second connection portion 180 are combined matches an edge shape of the non-contact portion 120. Accordingly, the interior of the main panel 100 is stably closed, thereby reducing the possibility that gas discharged from the inflator (not illustrated) leaks, so that the knee airbag 1 for vehicles may be stably deployed.

Further, referring to FIGS. 5 to 7, the first vertical length VL1 of the contact portion 140 may be longer than the sum of a first length L1 of the 1-1 end 242a and a second length L2 of the 1-2 end 242b of the side plate 240, and the second vertical length VL2 of the non-contact portion 120 may be longer than the sum of the third length of the 2-1 end 244a and a fourth length of the 2-2 end 244b of the side plate 240. This may mean that when the partition unit 200 is disposed inside the main panel 100, the first end 242 and the second end 244 of the side plate 240 do not invade the bypass flow path P2. Accordingly, since stable gas movement is possible through the bypass flow path P2, delay in deployment of the knee airbag 1 for vehicles may be prevented.

In addition, since the branch plate 220 does not further increase the length of the main flow path P1, a time for the gas that has passed through the bypass flow path P2 to reach an end point from a start point of the main flow path P1 may not be extended, and may be adjusted to a time intended during a design process. Accordingly, delay in deployment of the protection region A1 may be prevented, thereby preventing additional injury to an occupant who comes into contact with the knee airbag 1 for vehicles.

Figure 8:
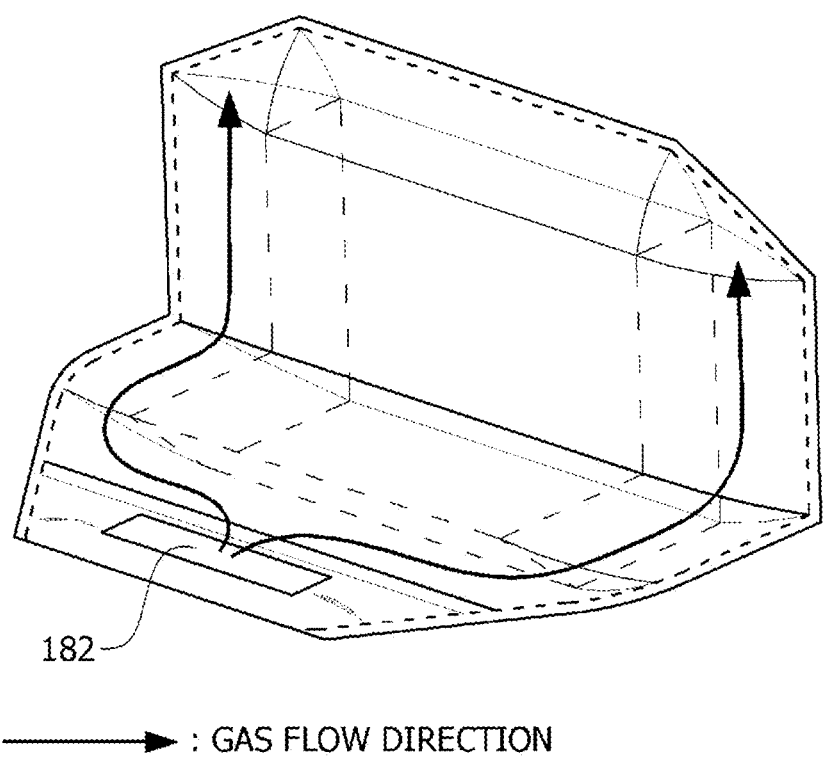
FIGS. 8 and 9 are diagrams illustrating paths along which gas moves inside the knee airbag for vehicles.
Figure 9:
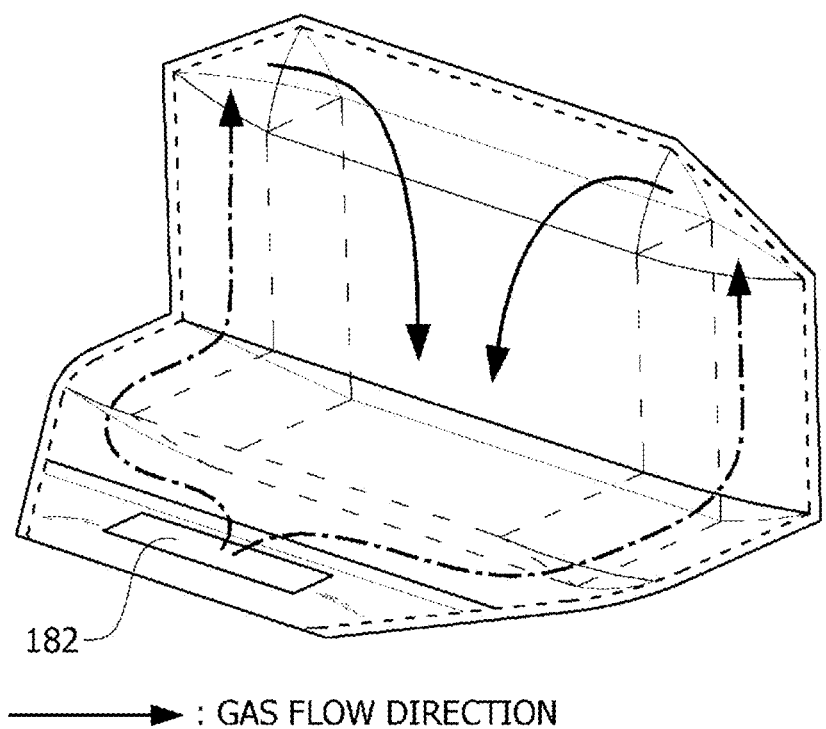

FIGS. 8 and 9 are diagrams illustrating paths along which gas moves inside a knee airbag for vehicles.

Referring to FIGS. 8 and 9, the knee airbag 1 for vehicles may be deployed through the following process.

First, when gas is discharged from the inflator (not illustrated) fixed to the fixing portion 182 of the main panel 100, the gas passes through the bypass flow path P2. As the gas passes through the bypass flow path P2, the non-protection region A2 is deployed, and at this time, the gas discharged from the inflator (not illustrated) is branched by the branch plate 220 of the partition unit 200 and is moved toward both sides of the main panel 100.

The gas moved toward the both sides of the main panel 100 does not flow to a central region of the main panel 100 due to the side plate 240 of the partition unit 200 and moves through the bypass flow path P2 between an edge region of the main panel 100 and the side plate 240. As the gas moves through the bypass flow path P2 as described above, the non-protection region A2 is first inflated.

After the non-protection region A2 is inflated, the gas reaches the main flow path P1 connected to the bypass flow path P2, as illustrated in FIG. 9. In this case, the gas that enters the main flow path P1 does not move to the bypass flow path P2 by the side plates 240. The gas is kept in the main flow path P1 by the side plates 240 disposed on both sides of the branch plate 220, thereby allowing the protection region A1 to be inflated.

In this way, unlike the existing knee airbag in which the entire region of the main panel 100 is deployed simultaneously, the knee airbag 1 for vehicles according to one embodiment of the present invention may form the protection region A1 and the non-protection region A2 in the main panel 100 through the partition unit 200 and construct a system in which the protection region A1 is deployed later than the non-protection region A2. Accordingly, abrasions or lacerations caused by an occupant's body grazing the main panel 100, where all regions are simultaneously deployed when a vehicle collision occurs, may be prevented.

In addition, in the knee airbag 1 for vehicles according to one embodiment of the present invention, the partition unit 200 may guide the deployment direction of the main panel 100. More specifically, the partition unit 200 may guide the main panel 100 in a direction toward the ceiling of the passenger compartment. Accordingly, since the need for separate parts to guide the deployment direction of the main panel 100 is reduced, manufacturing costs and manufacturing times may be reduced.

According to one embodiment of the present invention, since a protection region covering an occupant's body is deployed (delayed deployment) later than a non-protection region, additional injury to the occupant can be prevented.

In addition, since the need for separate parts to guide a deployment direction is reduced, manufacturing costs and manufacturing times can be reduced, thereby improving productivity.

Although the embodiments of the present invention have been described above, it is understood that one ordinary skilled in the art can make various changes and modifications to the present invention without departing from the spirit and scope of the present invention as hereinafter claimed. Further, it should be construed that differences associated with such changes and modifications fall within the scope of the present invention defined by the accompanying claims.

What is claimed is:

1. A knee airbag for vehicles disposed in a region facing an occupant's knees in a cockpit module, the knee airbag comprising:
    a main panel configured to be deployed toward the occupant; and
    a partition unit disposed inside the main panel and configured to partition an inner space of the main panel into a protection region and a non-protection region, and to form a bypass flow path inside the main panel so that the protection region is deployed later than the non-protection region,
    wherein the main panel includes:
        a non-contact portion configured to face the cockpit module when the knee airbag is deployed;
        a contact portion configured to face the occupant when the knee airbag is deployed;
        a first connection portion disposed between and separating the non-contact portion and the contact portion; and
        a second connection portion connected to the contact portion and configured to be folded over and connected to the non-contact portion,
    wherein the partition unit includes:
        a branch plate disposed proximate to the second connection portion; and
        side plates disposed at both ends of the branch plate, the side plates each being spaced apart from respective edge regions of the main panel to form branches of the bypass flow path along each of the side plates,
        wherein the branch plate is configured to direct gas entering the main panel toward each of the branches of the bypass flow path.

2. The knee airbag for vehicles of claim 1, wherein the partition unit forms a main flow path that defines a space in which gas passing through the bypass flow path deploys the protection region together with the main panel.

3. The knee airbag for vehicles of claim 1, wherein each of the side plates includes:
    a first end having an L-shape which causes the non-contact portion of the main panel to have a bent shape when the partition unit is disposed inside the main panel;
    a second end having an L-shape which causes the contact portion of the main panel to have a bent shape when the partition unit is disposed inside the main panel; and
    a third end that connects the first end and the second end and supports the branch plate.

4. The knee airbag for vehicles of claim 3, wherein the first end includes a first portion extending from the third end and a second portion that is inclined from the first portion to form the L-shape so as to guide a deployment direction of the non-contact portion when the knee airbag is deployed, and the second end includes a first portion extending from the third end and a second portion inclined from the first portion so as to guide a deployment direction of the contact portion when the knee airbag is deployed.

5. The knee airbag for vehicles of claim 4, wherein a first vertical length of the contact portion of the main panel is equal to a sum of a second vertical length of the non-contact portion of the main panel and a third vertical length of the second connection portion.

6. The knee airbag for vehicles of claim 5, wherein the first vertical length of the contact portion is longer than a sum of a first length of the first portion of the first end and a second length of the second portion of the first end of the side plate, and the second vertical length of the non-contact portion is longer than a sum of a third length of the first portion of the second end and a fourth length of the second portion of the second end of the side plate.

7. The knee airbag for vehicles of claim 4, wherein the third end is inclined rearwardly from the first portion of the first end to the second portion of the second end.

* * * * *